Feb. 20, 1968 H. B. KAST 3,369,759
ATOMIZING NOZZLE
Filed Jan. 13, 1966
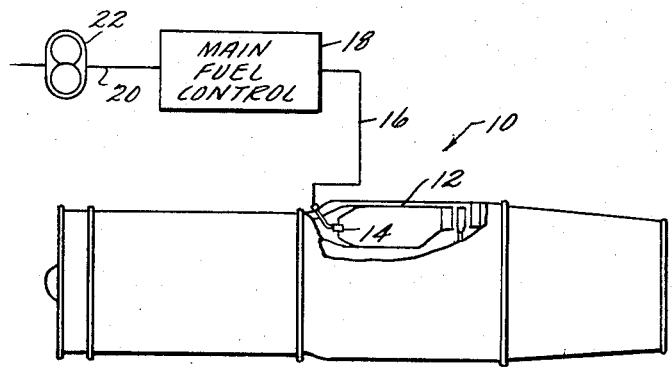
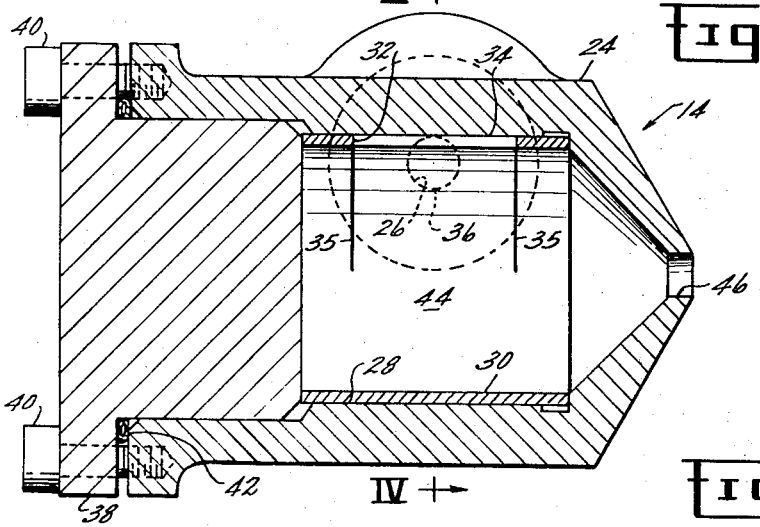
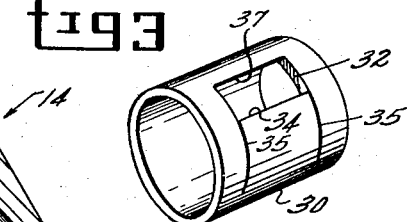
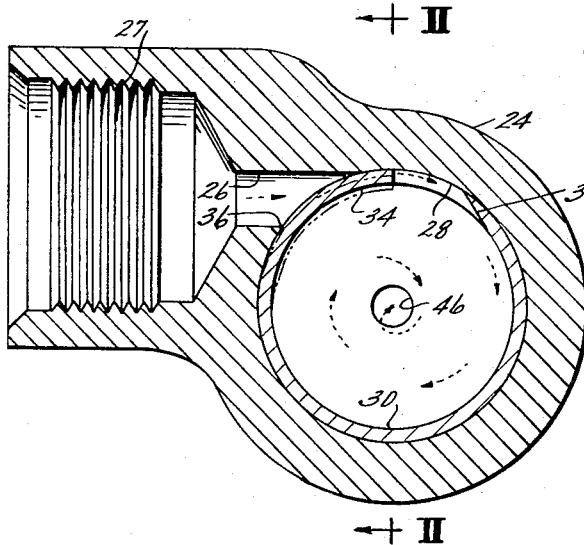
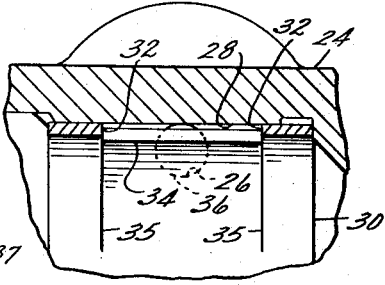
INVENTOR.
HOWARD B. KAST
BY
ATTORNEY United States Patent Office
3,369,759
Patented Feb. 20, 1968

3,369,759
ATOMIZING NOZZLE
Howard B. Kast, Fairfield, Ohio, assignor to General Electric Company, a corporation of New York
Filed Jan. 13, 1966, Ser. No. 520,511
4 Claims. (Cl. 239—471)

ABSTRACT OF THE DISCLOSURE

The disclosure illustrates a liquid atomizing nozzle having a cylindrical chamber which connects a tangential inlet passageway and a swirl type exit atomizing orifice. A sleeve having a reed integral therewith is positioned in the chamber. The reed overlies the tangential inlet passageway and provides a variable restriction to flow therefrom which enables the nozzle to effectively atomize fuel over a broad range of flow rates.

---

The invention described and claimed in the United States patent application herein resulted from work done under United States Government contract FA–SS–64–1. The United States Government has an irrevocable, non-exclusive license under said application to practice and have practiced the invention claimed herein, including the unlimited right to sublicense others to practice and have practiced the claimed invention for any purpose whatsoever.

The present invention relates to improvements in liquid atomizing nozzles and more particularly to nozzles adapted for use in a gas turbine fuel system where fuel flow rates vary over a wide range.

In the operation of gas turbine engines, and particularly those used for the propulsion of aircraft, fuel flow rates often vary over an extremely wide range. This problem is of increasing concern as improvements in engine technology require even greater ratios between maximum and minimum flow rates, ratios of 40 to 1 or higher now being sought.

There are various types of atomizing nozzles which can and have been employed to properly disperse fuel for combustion in gas turbine engines. Most, if not all, of the atomizing nozzles which are adapted for such purposes require that the fuel have a minimum velocity in order for proper atomization to occur. A further common characteristic is that as flow rates increase, the back pressure from the nozzle, which is reflected to the fuel pump, increases at an extremely rapid rate. Thus, for a flow rate range of 40 to 1 the back pressure which would result would require the use of an extremely high capacity pump which not only imposes a weight disadvantage when the engine is used for aircraft propulsion but also bleeds an unnecessarily large amount of power from the engine itself.

One approach to solving this problem is the use of so-called duplex nozzles wherein two concentrically arranged nozzle orifices are employed with fuel flow at a low rate being provided by one of the orifices and higher fuel flow rates being provided by the combined output from both orifices. Such duplex nozzles do not fully satisfy the need of minimizing back pressures at high flow rates and further involve the use of a mechanism which can pose a reliability problem.

It has also been proposed that flow of fuel to the atomizing orifice should be controlled through a variable area orifice and then directed into a so-called "swirl chamber" and discharged from an atomizing orifice in a fashion where dispersion is caused by centrifugal force on the fuel due to its circular motion. This approach offers the greatest advantages in obtaining the necessary velocity for atomization of the fuel while minimizing the back pressures which are built up at high fuel flow rates.

The object of the present invention is to provide improved, simple, practical, inexpensive and reliable liquid atomizing nozzles of the type where liquid flow is controlled by a variable area orifice and further to improve the atomization characteristics of such nozzles, all to the end of minimizing the pressure requirements for a fuel pump employed in delivering fuel over widely varying flow rates.

These ends in a broad sense are obtained by providing an atomizing nozzle comprising a housing having an inlet passageway and an exit atomizing orifice. Flow of liquid into the housing is controlled by a variable area orifice which is formed, in part, by a member which is yieldably maintained in a position providing a minimum control orifice opening at minimum flow rates. The yieldable member is progressively deflected towards a larger orifice opening in response to increases in liquid pressures thereagainst which occur at higher flow rates. With this arrangement at low pressures, and consequently at low flow rates, the liquid enters the housing at a relatively high velocity which provides proper atomization of the liquid. At increasing flow rates with consequent higher pressures the flow rate increases as a direct function of pressure due to the increase in orifice area and also as the approximate function of the square root of pressure so that the back pressure of the nozzle is greatly minimized, thereby facilitating the use of the nozzle over a wide range of flow rates.

Preferably the housing further comprises a cylindrical chamber through which the liquid is passed before being discharged from the atomizing orifice. The control orifice is preferably of an elongated rectangular configuration so that the liquid is discharged into the chamber in a relatively flat stream tangentially of the wall of the chamber, thus providing for a swirling action as above referred to. The free end of the yieldable member defines one of the elongated edges of this orifice so that as an increased flow rate occurs, the thickness of the stream of liquid introduced into the chamber is increased without disturbing the effectiveness of the swirling action which is obtained.

The above and other related objects and features of the invention will be apparent from a reading of the following description of the disclosure found in the accompanying drawing and the novelty thereof pointed out in the appended claims.

In the drawing:

FIGURE 1 shows, schematically, a gas turbine engine fuel system environment for the present invention.

FIGURE 2 is a longitudinal section, taken on line II—II in FIGURE 4, of the fuel nozzle indicated in FIGURE 1.

FIGURE 3 is a perspective view of a sleeve shown in FIGURE 2.

FIGURE 4 is a view taken on lines IV—IV of FIGURE 2.

FIGURE 5 is a fragmentary section of the nozzle, as shown in FIGURE 2, illustrating the action of a yieldable member which forms a variable area control orifice.

FIGURE 1 shows schematically the basic components of a typical gas turbine engine fuel control system in which the present invention may be utilized. A gas turbine engine 10 comprises a combustor 12 in which fuel is atomized by a series of combustor nozzles 14 (only one of which is shown). Fuel is delivered to the nozzles 14 by a conduit 16 from a main fuel control 18. Fuel is fed to the main fuel control through a conduit 20 from a fuel pump 22 whose drive shaft is mechanically connected to the rotor of engine 10 and is driven thereby. The main fuel control may be any device which is adapted to schedule delivery of fuel to the nozzles 14 at a rate set by pilot demand and modified by several engine operating parameters. Due to certain novel features of the combustor nozzle 14, which will be discussed later, fuel is uniformly atomized over an extremely wide range of fuel flow rates while nozzle back pressures at higher fuel flow rates are minimized, thereby resulting in lower maximum pressure requirements of the fuel pump 22 and hence longer pump life.

Reference is now had to FIGURES 2–5 which show in detail the combustor nozzle 14. A housing 24 contains an inlet passageway 26 which is connected to fuel line 16 (FIGURE 1) by a fitting (not shown) adapted to be received in the threaded recess 27 of housing 24. The passage 26 is disposed generally tangential to a bore 28 and forms an entrance port 36 thereto. A rotatable sleeve 30, shown separately in FIGURE 3, is snugly received in the bore 28 and has an opening 32 defined on one side by the free end of a reed 34 integrally formed with said sleeve by cut slits 35 whose width is minimized for reasons which will be discussed later. The angular position of sleeve 30 is such that reed 34 overlies port 36 of inlet passageway 26. A cap 38, affixed to the housing 24 by means of bolts 40, holds sleeve 30 in a desired angular position and cooperates with sleeve 30 and housing 24 to form a cylindrical swirl chamber 44. An O-ring 42 provides a seal which prevents leakage of fuel past the cap 38. A relatively large area exit atomizing orifice 46 is formed in a conical shaped portion of the swirl chamber to permit flow of fuel from the nozzle 14 to the interior of combustor 12 of FIGURE 1.

During shutdown conditions the reed 34 of sleeve 30 normally covers the port 36 as indicated in FIGURE 2. As fuel is introduced into inlet passageway 26 by the main fuel control device 18 of FIGURE 1, pressure builds up on reed 34 and causes it to deflect toward the interior of housing 24, as shown by phantom lines in FIGURE 4, and also in FIGURE 5, thus allowing passage of fuel through opening 32. The opening 32 is beveled at 37 to provide for smooth flow of the fuel as it enters tangentially into the swirl chamber 44. FIGURE 5 shows that the free end of reed 34 cooperates with the surface of bore 28 and the sides of opening 32 to form a rectangular orifice whose area is directly proportional to the deflection of reed 34. The pressure drop across the rectangular orifice increases the velocity of the flow therethrough and because it is directed generally tangential to the swirl chamber 44, fuel is forced into a circular path. The fuel follows a spiral path along the interior of sleeve 30 as its velocity increases while passing along the conical shaped portion of housing 24. The fuel then passes through atomizing orifice 46, which has an area large enough to result in a negligible pressure drop thereacross. Once the fuel passes through orifice 46, it is dispersed in a hollow atomized cone by the centrifugal force imparted thereto in the swirl chamber. This type of atomization provides uniform particle distribution and a stable pattern throughout a wide range of fuel flow rates so long as a minimum velocity of the fuel is maintained. Furthermore, the relatively large area of the exit orifice 46 results in a very low fuel contaminant sensitivity.

As has been indicated, a certain minimum fuel velocity is required in the swirl chamber to produce proper atomization, which velocity may be calculated by empirical formulas that are well known in the art. The pressure drop across the rectangular orifice of nozzle 14 and consequent velocity increase is sufficient for proper atomization of the fuel at extremely low flow rates.

As the flow rate through inlet passageway 26 increases, the reed 34 is deflected further by the consequent pressure increase and the area of the rectangular orifice is increased. The progressively increasing area of the control orifice minimizes increases in the back pressure in the inlet passageway 26 at higher flow rates since the desired increase in flow rates is a twofold function of pressure. This is to say that flow increases as a function of approximately the square root of pressure and also as a direct function of pressure since the control orifice area increases as a direct function of pressure.

It is therefore apparent that the variable area rectangular orifice performs a twofold function, namely, causing a pressure drop thereacross which increases the velocity of the fuel such that it will be forced into a circular path in the swirl chamber and atomized at low flow rates, while at the same time reducing the back pressure of the nozzle at high flow rates. This minimizes the maximum pressure requirements of fuel pump 22 and hence extends its life. Furthermore, this characteristic of the nozzle permits uniform atomization over extremely wide ranges of flow rates, such as in the order of 40 to 1. It will also be appreciated that the rectangular flow control orifice directs a relatively thin, flat stream of fuel tangentially into the swirl chamber 44. At higher flow rates the thickness of this stream simply increases. This arrangement for inducing the desired swirling action has been found highly effective in providing proper atomization of the fuel throughout wide flow rate ranges.

It can be seen that the spring rate of reed 34 determines the increase in area of the rectangular orifice with an increase in flow rates, a high spring rate giving a higher restriction at high flow rates and a lower spring rate giving correspondingly lower restriction. The particular requirements of nozzle back pressure versus flow for the nozzle may be fulfilled by selecting a reed of predetermined length and width. Since materials ordinarily used in the manufacture of reeds have little variation in spring rate, it is apparent that the spring rate of the reed is primarily determined by the physical dimensions thereof. This is of particular advantage in instances where a multiplicity of nozzles having equal performance characteristics are to be provided. Known manufacturing processes can be employed to hold the dimensions within design limits to produce uniform results.

To some extent, and particularly at low flow rates or initial flow, the pressure drop across the flow control orifice may be adjusted by selecting the extent to which reed 34 overlies port 36. This variation changes the moment arm for deflection of reed 34 during minimum flow by the pressure acting thereon through opening 36. It can be seen that with greater overlie of port 36 a larger pressure in inlet passageway 26 is required to deflect the reed a given amount. Consequently, the resultant pressure drop across the rectangular orifice is greater, which results in higher velocity therethrough. As the reed 34 deflects further upon an increase in flow, the pressure thereon tends to act uniformly over the entire length of the reed 34. It is apparent then that the moment arm for deflection of the reed 34 does not substantially change with further flow increases, resulting in a relatively constant spring rate which has a negligible effect on the nozzle back pressure versus flow characteristics. Means may be conveniently provided for rotation of sleeve 30 in bore 28 to obtain a predetermined pressure drop for proper atomization at minimum flow rates.

The same result may be achieved by bending reed 34 outwardly so that it applies a preload to the surface of bore 28. In this instance, an increased pressure in inlet passageway 26 is required to initially deflect reed 34 and this increased pressure is reflected in a greater pressure drop across the rectangular orifice. The preload of reed 34 against bore 28 may be varied to obtain a particular pressure drop across the rectangularly shaped orifice to provide proper atomization at minimum flow rates. The preloading of reed 34 has a negligible effect on the spring rate thereof and does not affect the nozzle operating characteristics.

The ease with which the nozzle described above may be manufactured and calibrated to the design performance characteristics enables significant savings in the overall cost of the nozzle.

It was previously stated that the rectangular orifice of nozzle 14 was formed by the cooperation of reed 34, bore 28, and the sides of opening 32. The maximum deflection of reed 34 is such that it never clears the sides of opening 32. In most cases the total deflection of reed 34 is quite small and in any event produces a negligible effect on the flow pattern of the fuel in the swirl chamber 44. With such small deflections, the resultant stress of the reed member is readily maintained well below the yield strength of the reed material giving a high degree of reliability over at least the normal life expectancy of the nozzle.

The slits 35 which result when sleeve 30 is machined to form reed 34 are of minimal width, as previously stated, to prevent leakage therethrough which would impair the flow path. The leakage which does result is small in comparison to the magnitude of the main stream of fuel. The minimum width of slits 35 together with the fact that reed 34 never clears the sides of port 32 cause most, if not all, of the flow into the swirl chamber to be generally tangential. Because the length of the rectangular orifice, formed in part by reed 34, is great in comparison to its width, the flow into the swirl chamber 44 is in the form of a relatively thin flat sheet which stabilizes the flow therethrough and greatly improves atomization.

Modifications of the presently known, preferred embodiment of the invention will occur to those skilled in the art within the scope of the present invention concept which is to be derived solely from the following claims.

Having thus described the invention, what is claimed as novel and desired to be secured by Letters Patent of the United States is:

1. A liquid atomizing nozzle comprising
    a housing having a cylindrical chamber in communication with an inlet passageway and an exit atomizing orifice,
    means forming an orifice for controlling the flow of liquid through said inlet passageway,
    said control orifice forming means including a reed anchored in said chamber and conforming to the cylindrical surface thereof, said reed being disposed to overlie the entrance of said passageway into said chamber and deflect inwardly in response to increases in liquid pressure thereagainst in the inlet passageway,
    whereby at low pressures and consequent low flow rates the liquid enters said housing at a relatively high velocity, and at high flow rates and consequent higher pressures a relatively low back pressure is maintained in the inlet passageway, thus facilitating use of the nozzle over a wide range of flow rates.

2. A liquid atomizing nozzle as in claim 1 wherein
    a sleeve is snugly received in said chamber and has an opening defined on one side by the free end of said reed,
    said reed being integrally formed with said sleeve and defined in part by a pair of slits in said sleeve,
    whereby the free end of said reed in combination with the sides of said opening and the surface of said cylindrical chamber forms a variable area rectangular orifice when said reed is deflected inwardly in response to said liquid pressures in said passageway means.

3. A liquid atomizing nozzle as in claim 2 wherein
    said sleeve has said opening with the side opposite the free end of said reed beveled away from said orifice, thereby enabling smooth flow thereacross,
    said sleeve is rotatable in said chamber to selectively establish the extent to which said reed overlies said inlet passageway entrance, to thereby establish a desired liquid velocity into said chamber,
    said slits defining said reed are of minimum width to minimize, if not eliminate, flow of liquid therethrough to maintain substantially all liquid flow in a tangential direction as it is discharged into said chamber,
    said chamber has a conical portion leading to said atomizing orifice, and
    said exit atomizing orifice has a relatively large area, whereby the velocity of said liquid through said orifice is maximized to improve atomization.

4. A liquid atomizing nozzle as in claim 2 wherein,
    the reed in said sleeve is deformed in a radially outward direction to seal said inlet passageway with a preloaded force,
    whereby a predetermined minimum liquid pressure in said inlet passageway is required to deflect said yieldable member to permit flow therethrough.

References Cited
UNITED STATES PATENTS 2,719,755  10/1955  Stanley _____ 239—468

M. HENSON WOOD, Jr., *Primary Examiner.*

H. NATTER, *Examiner.*